May 1, 1962 K. E. WILHELM 3,031,888
TEMPERATURE MEASURING APPARATUS
Filed Nov. 6, 1957 4 Sheets-Sheet 1

INVENTOR
Kurt E. Wilhelm
BY
Burns, Doane, Benedict & Irons
ATTORNEYS

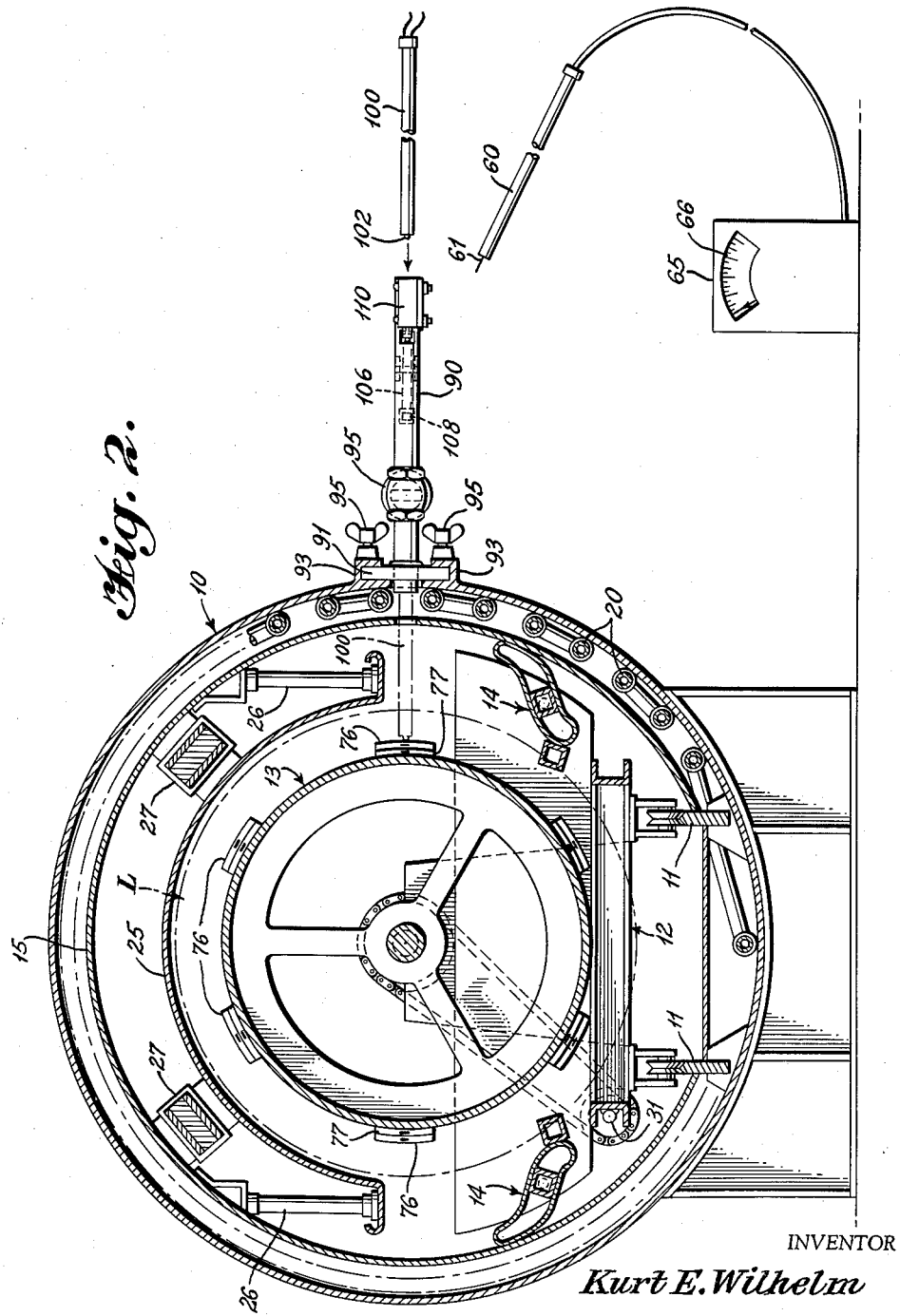

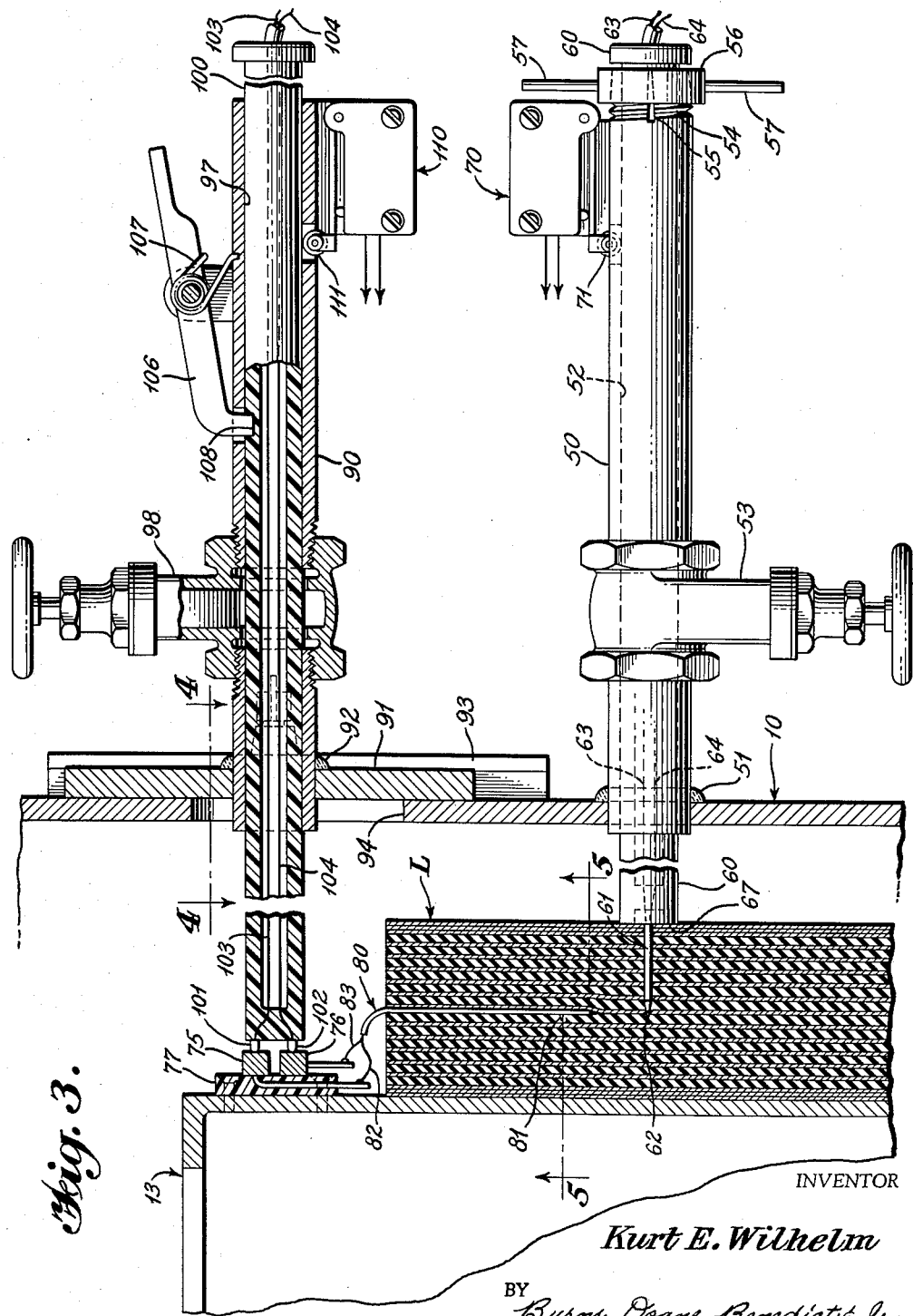

May 1, 1962 K. E. WILHELM 3,031,888
TEMPERATURE MEASURING APPARATUS
Filed Nov. 6, 1957 4 Sheets-Sheet 4

INVENTOR
*Kurt E. Wilhelm*

BY
*Burns, Doane, Benedict & Irons*
ATTORNEYS

United States Patent Office 3,031,888
Patented May 1, 1962

3,031,888
TEMPERATURE MEASURING APPARATUS
Kurt E. Wilhelm, 6 Knapton St., Barrington, R.I.
Filed Nov. 6, 1957, Ser. No. 694,790
2 Claims. (Cl. 73—351)

This invention relates generally to apparatus for measuring the temperature of material being cured by heating in a chamber and giving an indication of such temperature exteriorly of the chamber. More particularly, the invention is directed to measuring the internal temperature of a load of material, such as rubber being vulcanized, as such material is being cured by internal heating effected by high frequency dielectric heating.

In Rhee et al. Patent 2,743,479, issued May 1, 1956, there is disclosed an apparatus for vulcanizing rubber-like sheet material such that effectively uniform vulcanization of a substantial length of sheet material to be cut up into threads can be produced. Basically the apparatus of this patent utilizes an autoclave in which a load of sheet rubber wrapped on a cylinder is disposed for vulcanization. In order to insure uniform vulcanizing of the rolled rubber sheet, the apparatus of this patent employs dielectric heating means whereby the internal temperature of the rubber is brought up at a rate such that no part of the sheet rubber load is excessively heated to result in burning and consequent production of defects in the final cured sheet. Along with the dielectric heating, the patented apparatus incorporates heating means to raise the temperature of the atmosphere within the autoclave corresponding to the rate of temperature rise within the material.

The uniformity of results in curing of rubber-like material utilizing apparatus of the above identified patent has been outstanding. Such apparatus has made it possible to effect vulcanization of extremely long sheet lengths with little or no wastage of rubber due to burning or the production of other vulcanizing defects as occurred under prior sheet rubber vulcanizing proposals.

Dielectric heating causes an increase in the internal temperature of the dielectric material being heated as this form of heating is carried out. To control and insure that the internal temperature of the mass being cured does not rise excessively, it is desirable to be able to determine the internal temperature of the material which has been exposed to the dielectric heating action. In determining this internal temperature in the apparatus of the above patent, it is also desirable to be able to make such determination without having to open the autoclave and thereby expose the material to cool atmospheric air and lose the inert gas pressure maintained within the autoclave during curing.

Having in mind the desirability of being able to determine the internal temperature of the material being cured within an autoclave without entering the autoclave during the heating and curing process, it is a primary object of this invention to provide apparatus for measuring the temperature of material while it is enclosed within a chamber and give an indication externally of the chamber as to the magnitude of the temperature.

It is also an object of this invention to provide apparatus for measuring the internal temperature of material to be cured in a chamber wherein an indication of the internal temperature is given externally of the chamber.

It is a further object of this invention to provide temperature measuring apparatus operable in conjunction with curing a material in an enclosed chamber such that the temperature of such material may be raised internally without reaching an excessive point which would burn or otherwise deleteriously effect the resulting cured product.

It is also an object of this invention to provide temperature measuring apparatus wherein the internal temperature of a load of rubber-like material to be cured by dielectric heating means can be determined while the material is retained within an enclosed chamber and wherein an indication of the temperature is provided exteriorly of the chamber.

Other and more specific objects of this invention will become more clearly apparent by reference to the hereinafter set forth description of specific embodiments of this invention. For the accomplishment of such objects, this invention comprises the means hereinafter fully described and particularly pointed out in the claims. The annexed drawings and the following description sets forth in detail structures embodying the invention. Such structures, however, are only illustrative mechanical forms in which the principle of this invention may be employed.

Referring to the drawings:

FIGURE 2 is a transverse sectional view taken on line 2—2 of FIGURE 1;

FIGURE 3 is a detailed view partially in section showing the temperature measuring structures of the instant invention;

The temperature measuring structures of the instant invention are shown associated with rubber vulcanizing apparatus as disclosed in Rhee et al. Patent 2,743,479, issued May 1, 1956, wherein such structures have particular applicability and utility. Only those portions of the vulcanizing apparatus pertinent to the instant invention are specifically illustrated on the drawings. For a more complete showing of such vulcanizing apparatus, reference should be had to the above mentioned patent.

Figure 1:
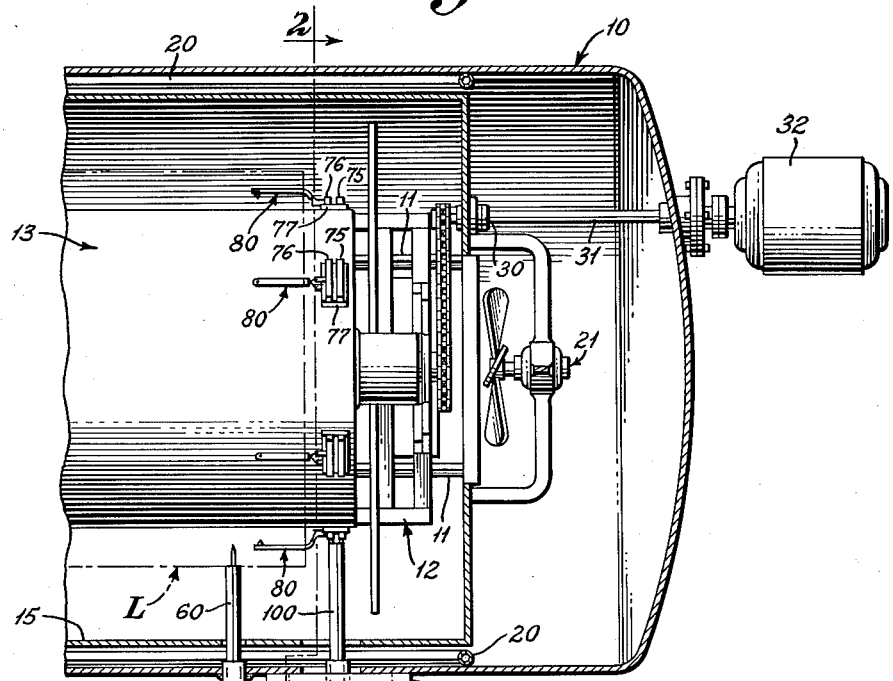
FIGURE 1 is a partial horizontal sectional view of an autoclave and load supporting carriage with the temperature measuring apparatus of the instant invention associated therewith.
Figure 6:
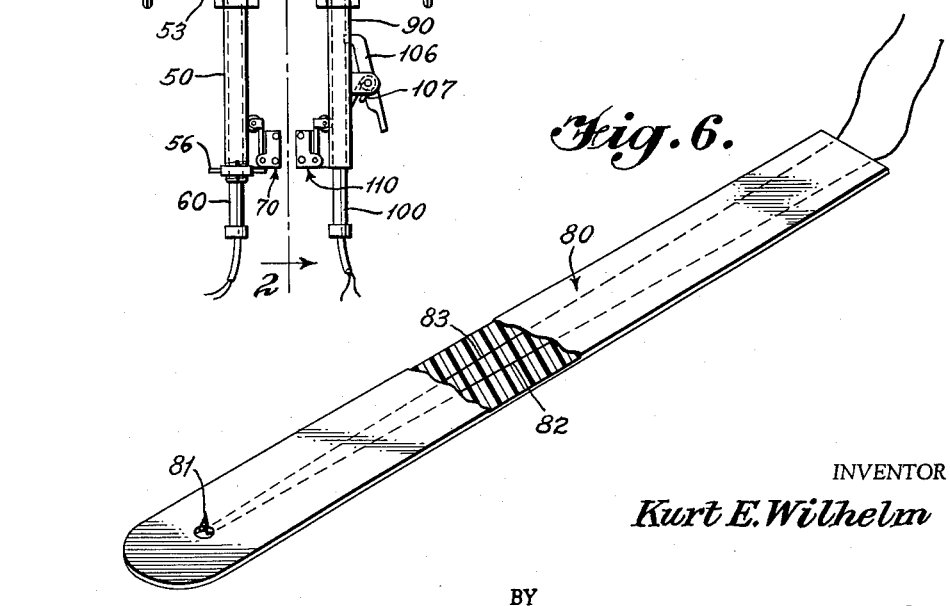
FIGURE 6 is a perspective view of the thermocouple carrying strip employed with one of the embodiments of the instant invention.
Figure 4:
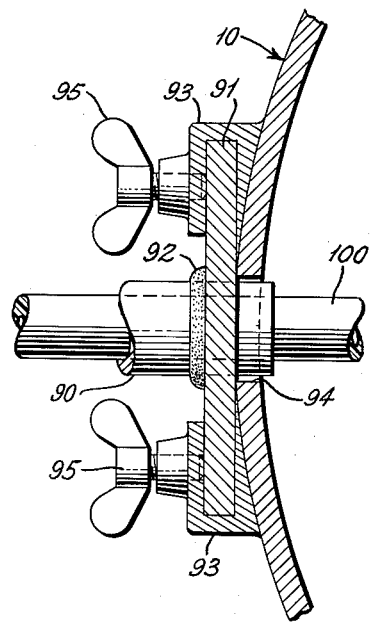
FIGURE 4 is a detailed sectional view taken on line 4—4 of FIGURE 3.
Figure 5:
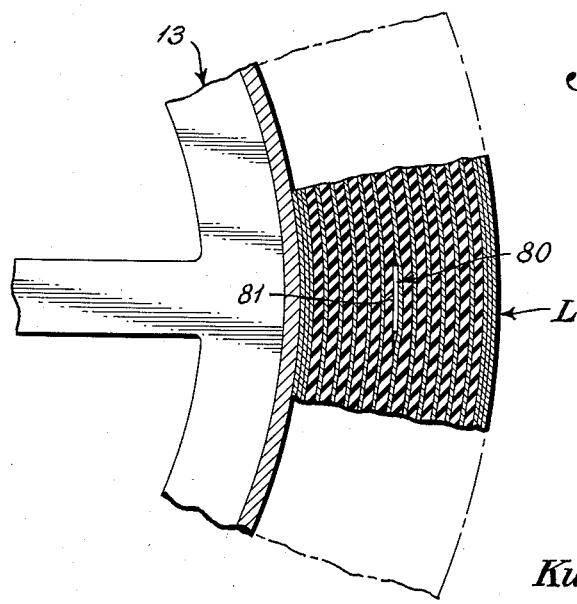
FIGURE 5 is a detailed partial section taken on line 5—5 of FIGURE 3.

As shown on FIGURES 1 and 2 of the drawings, the apparatus includes a cylindrical autoclave 10 closed at one end and having an access door (not shown) at the other end. A pair of tracks 11 extend longitudinally of the bottom of the autoclave to support and guide movement of a carriage 12 into the autoclave. The carriage has a load supporting cylinder 13 rotatably mounted thereon. The load of rubber-like material to be cured is wound onto cylinder 13 in the manner more fully described in the above referred to patent. As described in such patent, rubber to be vulcanized, in the form of a calendered rubber sheet, is wrapped around cylinder 13 with paper being interleaved and wrapped with the rubber sheet to build up a load in the form of a roll having adjacent laminations of calendered rubber and paper.

The carriage 12 has grounded flaps 14 mounted longitudinally thereof to be pivoted into engagement with a wall 15 forming a part of the autoclave. These flaps function to effectively ground the carriage for more efficient operation of the dielectric heating means in the autoclave.

Suitable steam heating coils 20 are provided in the space between wall 15 and the outer wall of the autoclave to raise the temperature of the atmosphere within the autoclave along with the temperature rise within the load produced by dielectric heating. A fan 21, as shown in FIGURE 1, is provided to circulate the atmosphere within the autoclave and maintain a near uniform temperature therein. As pointed out in the above mentioned patent, an inert atmosphere under pressure is introduced into the autoclave during the vulcanizing operation to reduce the possibility of arcing between the electrodes of the dielectric heating means and further to preclude blow holes and other defects from developing in the rubber during the vulcanizing process.

The high frequency dielectric heating means utilizes cylinder 13 on carriage 12 as one of its electrodes, this cylinder being grounded, as hereinabove noted, to the remaining structure of the autoclave. A hot or high tension electrode 25 for the dielectric heating means is mounted on insulators 26 within the autoclave to be essentially concentric with the exterior of cylinder 13 when carriage 12 is positioned in the autoclave. Adjustable tuning stubs 27 are provided between the electrode 25 and wall 15 of the autoclave to tune the dielectric heating means in conformity with the load to be cured. It will be appreciated that the output from a high frequency generator (not shown) is applied across electrode 25 and cylinder 13 to effect dielectric heating of the load.

A coupling 30 is provided to engage with means on the carriage 12 so that when the carriage is moved into proper position in the autoclave, the cylinder 13 and load carried thereon can be rotated by a shaft 31 driven by an electric motor 32 mounted exteriorly of the autoclave.

As referred to hereinabove, operation of the high frequency dielectric heating means results in internal heating of the dielectric material, i.e., the interleaved sheet rubber and paper load, so as to raise the internal temperature of such load. From the known mass of the load and its dielectric characteristics, the power input required to produce a particular temperature rise in the load can be theoretically computed. However, in practical application such computed power requirement may not raise the load temperature to the desired point or, on the other hand, an excessive temperature within the load may be produced. For optimum results, the internal temperature of the load should be determined to insure that it is not excessively heated or underheated by the dielectric heating means.

To enable determination of the temperature existent interiorly of the load, the instant invention provides structures for measuring this temperature and indicating the result of such measurement at a point exteriorly of the autoclave. A tubular member 50 is mounted on the cylindrical wall of autoclave 10 as by means of welding 51, so that such member extends radially outwardly from the autoclave and has its axis aligned with a point on the periphery of the autoclave carriage cylinder 13, such point lying inwardly from the end of such cylinder and over which the rolled load is disposed. Member 50 provides a passage 52 communicating with the interior of the autoclave and has a valve 53 by means of which the passage 52 may be opened and closed for a purpose as will be described.

The outer end of member 50 is threaded at 54 and suitably slotted at 55. An internally threaded collar 56, wherein the threaded portion is tapered, is applied on threads 54. Actuating pins 57 are provided on collar 56 so that it may be threaded onto member 50 to contract the outer end thereof and form a clamp for a purpose to be described.

An elongated probe 60 having a cross sectional diameter generally corresponding to the diameter of passage 52 is provided to be slidable through such passage upon opening of valve 53. Probe 60 has at the inner end thereof a needle element 61 provided with a thermal sensitive element in the form of a thermocouple junction 62 at the pointed end thereof. Leads 63 and 64 extend outwardly through probe 60 from thermocouple junction 62 and extend to a suitable temperature indicating device 65 which has a dial 66 calibrated to indicate the temperature sensed by the thermocouple junction 62. The operation and functioning of thermocouple temperature detecting units is well known, and further detailed description herein would not appear to be necessary.

Although preferably a thermocouple junction is to be employed, it will be readily recognized that within the scope of the instant invention other thermal sensitive means may be employed, such as a resistance wire temperature sensing element.

As shown more clearly in FIGURE 3, the needle element 61 carrying thermocouple junction 62 is projected into the load L by means of probe 60. The needle element thus pierces the laminations of the load L at a point spaced inwardly from the edge of the rolled load so that the thermocouple junction 62 is, in its temperature detecting position, disposed to be imbedded substantially in the center of the load between the radially inner and outer dimensions thereof. A shoulder 67 between the end of probe 60 and needle element 61 serves to limit the extent of insertion of needle element 61 into load L.

To retain the probe in fully engaged position, the collar 56 may be threaded onto threads 54 to contract and thereby clamp the end of member 50 about probe 60.

In the operation of the vulcanizing apparatus with which the instant invention finds particular applicability, the rolled load carried by the cylinder 13 is rotated during the heating action effected by the dielectric heating means and during curing. Whereas it will be noted that the probe 60 projects between steam coils 20 through a suitable aperture in wall 15 and beneath electrode 25, it is not desirable that the dielectric heating means be energized during the temperature taking operation. Of course the load cannot be rotated while the needle element 61 is inserted thereinto. Accordingly, a switch 70 is mounted on member 50 with the actuating element 71 thereof positioned to be engaged by probe 60. Switch 70 is connected so that while probe 60 is positioned within passage 52, electric motor 32 and the dielectric heating means are rendered inoperative. Upon withdrawal of probe 60, switch 70 operates to re-energize the circuits to motor 32 and to the dielectric heating means. This switch functions as a safety feature in preventing accidental insertion of the probe while the motor 32 is rotating the load and/or while the dielectric heating means is in operation.

As heretofore noted, during temperature build-up and curing of the load, a super atmospheric inert gas, such as carbon dioxide, is applied interiorly of the autoclave. During the temperature build-up and vulcanizing operation, the probe 60 is withdrawn from passage 52 and valve 53 closed. When the estimated required power to raise the load temperature to approximately the desired point has been applied to the load by the dielectric heating means, rotation of the load and energization of the dielectric heating means are terminated. Probe 60 is inserted into the elongated passage 52 up to valve 53 with the valve still closed. By reason of the probe having a cross sectional size generally corresponding to that of passage 52, when valve 53 is opened, little gas can escape through passage 52. When the valve is fully opened, the probe is inserted to assume a position as shown in FIGURE 3. The clamp provided by collar 56 may then be actuated to hold the probe in place against the super atmospheric pressure existent within the autoclave 10.

With the probe so positioned, the temperature sensed by thermocouple junction 62 may be read from scale 66 on the temperature indicating device 65.

A second mode of temperature determination which does not entail the use of a material puncturing needle, as in the case of the structure described hereinabove, is provided by mounting spaced contact bars 75 and 76 on an insulating plate 77 secured adjacent the end and on the periphery of cylinder 13. Any suitable number of these bars and plates may be mounted on the cylinder in accordance with the number of positions where the temperature of the load is to be taken.

A thermal sensitive element carrying strip 80 is made up, having as illustrated, a thermocouple junction 81 at one end thereof, with conductors 82 and 83 extending through the strip from such junction to be suitably connected to the respective contact bars 75 and 76. Strip 80 may be effectively formed by laminating layers of thin heat-resistant flexible material with the conductors and thermocouple junctions disposed therebetween. It will be appreciated that the thermal sensitive element may take the form of a resistance wire element or other thermal sensitive means instead of the thermocouple specifically illustrated.

As shown more clearly in FIGURE 3, conductor 82 is connected with contact bar 75 and conductor 83 connected with contact bar 76. The strip 80 is interleaved with the laminations of the load L when the sheet rubber and paper are wound on cylinder 13, so that the strip will lie imbedded in the load at a point substantially midway between the radially inner and outer limits of the rolled load and the thermocouple junction 81 will be disposed at a point spaced inwardly from the edge of the load. As shown in FIGURE 1, a series of strips 80 and corresponding bars 75 and 76, and plates 77 may be provided at points circumferentially spaced around the load to enable temperature determination at each of such points as desired.

A tubular member 90 mounted on a plate 91 as by means of welding 92 is provided, with such plate being adjustably supported on the exterior of autoclave 10 by means of facing channels 93 secured to the wall of the autoclave. An elongated opening 94 is provided in the wall of autoclave 10. The plate 91 carrying member 90 may be adjusted longitudinally of the autoclave and located in the desired position by tightening bolts 95, the ends of which will clamp plate 91 in position relative to channels 93.

Member 90 provides a passage 97 which communicates with the interior of the autoclave and is directed toward the periphery of cylinder 13 adjacent the end thereof when the carriage is properly positioned within the autoclave. Adjustment of the axis of passage 97, so that it is directed toward the periphery of cylinder 13 where contact bars 75 and 76 are mounted, may be made by appropriate adjustment of plate 91.

A suitable valve 98 is provided in member 90 to enable opening and closing of passage 97. A probe 100, adapted to be inserted through passage 97 and be slidable therein, is provided. This probe has a contact 101 and a contact 102 mounted on the inner end thereof and spaced to engage with contact bars 75 and 76 respectively. Leads 103 and 104 extend through probe 100 from contacts 101 and 102 respectively, and are connected to a suitable temperature indicating device exteriorly of the autoclave such as device 65 to which probe 60 is shown connected on FIGURE 2.

A latch 106 is pivotally mounted on member 90 and has a spring 107 urging the end thereof into passage 97. A notch 108 is provided on the exterior of probe 100 so that upon proper insertion of the probe into passage 97, latch 106 will engage in notch 108 to hold the probe in place against displacement by pressure existent interiorly of the autoclave.

A switch 110 is mounted on the exterior of member 90 with the actuating element 111 thereof positioned to operate the switch upon insertion and removal of probe 100.

The similar features and operation between probe 100 and probe 60, as described heretofore, will be readily recognized. Thus, it will be appreciated that valve 98 functions similar to valve 53, that latch 106 performs a function comparable to clamping collar 56. Switch 110 is also connected to effect de-energization of motor 32 and the dielectric heating means when the probe 100 is inserted in passage 97.

In utilizing the temperature determining structure including probe 100, the probe is inserted so that contacts 101 and 102 engage contact bars 75 and 76 respectively. It will be appreciated that the cylinder 13 will have been appropriately rotated to align one or another of the sets of contact bars with the axis of probe 100. With the contacts on probe 100 engaged with a pair of the contact bars, the temperature sensed by thermocouple junction 81 will be reflected by the temperature reading on the temperature indicating device connected to leads 103 and 104 exteriorly of the autoclave. It will be appreciated that by rotation of cylinder 13 the various contact bars mounted on the end of such cylinder can be selectively positioned opposite the location of probe 100 and the probe engaged in succession with the pairs of contact bars to obtain temperature readings at the points where strips 80 are disposed in the load.

It will be appreciated that while probes 60 and/or 100 are positioned in their respective passages 52 and 97, escape of gas from the autoclave will be effectively blocked. If or when one of the probes is withdrawn completely from its passage, the valve for such passage will be closed before complete withdrawal of the probe to prevent escape of gas from the autoclave.

Having thus described my invention, I claim:

1. In apparatus for curing sheet rubber-like solid material, an autoclave having an access door for the introduction of the solid material thereinto, a cylinder rotatably supported within said autoclave and providing an outwardly facing cylindrical surface to carry a rolled load of the sheet solid material, said surface being spaced inwardly of the autoclave wall and at a predetermined position within said autoclave, means for rotating said cylinder with the load thereon during curing thereof, high frequency dielectric heating means within said autoclave for heating the solid material, means providing a tubular passage extending outwardly relative to the wall of said autoclave with the axis thereof directed toward said surface and the axis of said cylinder, a probe member removably insertable into said passage and having a cross sectional configuration to substantially fill the cross section of said passage, closure means in said passage intermediate the ends thereof to enable closure of said passage when said probe member is removed therefrom, leads extending through said probe member, temperature indicating means connected to said leads externally of said autoclave, a thermal sensitive element insertable to be imbedded in the rolled load of sheet solid material to be heated at a point axially inwardly of said tubular passage and connected through the leads in said probe member when the probe member is inserted through said passage to said indicating means to provide an indication of the internal temperature of the solid material, and switch means associated with said passage to be operated upon insertion of said probe member therein to render inactive said cylinder rotating means and said dielectric heating means.

2. In apparatus as recited in claim 1 wherein said probe member has a needle element at the inner end thereof with said thermal sensitive element in the form of a thermocouple junction mounted on the end of said needle element to be inserted through several layers of the rolled sheet solid material to derive an indication of the internal temperature of the solid material.

References Cited in the file of this patent

UNITED STATES PATENTS

| | | |
|---|---|---|
| 433,311 | Starrett | July 29, 1890 |
| 1,812,282 | Blaker | June 30, 1931 |
| 1,876,712 | Maynard | Sept. 13, 1932 |
| 2,161,950 | Christensen | June 13, 1939 |
| 2,232,824 | Maher | Feb. 25, 1941 |
| 2,428,129 | Smith | Sept. 30, 1947 |
| 2,508,382 | Gard | May 23, 1950 |
| 2,607,872 | Enabnit | Aug. 19, 1952 |
| 2,631,220 | Barsy | Mar. 10, 1953 |
| 2,743,479 | Rhee et al. | May 1, 1956 |
| 2,815,663 | Lupfer | Dec. 10, 1957 |
| 2,821,905 | Culligan | Feb. 4, 1958 |
| 2,839,594 | Schneidersmann | June 17, 1958 |

FOREIGN PATENTS

| | | |
|---|---|---|
| 223,038 | Germany | June 11, 1910 |